United States Patent [19]

Suzuki et al.

[11] 4,125,870
[45] Nov. 14, 1978

[54] INFORMATION TRANSFER CONTROL SYSTEM

[75] Inventors: Seigo Suzuki, Yokohama; Yoshiaki Moriya, Inagi, both of Japan

[73] Assignee: Tokyo Shibaura Electric Co., Ltd., Tokyo, Japan

[21] Appl. No.: 732,730

[22] Filed: Oct. 15, 1976

[30] Foreign Application Priority Data

Oct. 15, 1975 [JP] Japan .................................. 50-124139

[51] Int. Cl.² .......................... G11C 7/00; G11C 8/00
[52] U.S. Cl. .................................................. 364/900
[58] Field of Search .................. 340/172.5; 365/81; 364/200 MS File, 900 MS File

[56] References Cited

U.S. PATENT DOCUMENTS

| | | | |
|---|---|---|---|
| 3,421,149 | 1/1969 | Kretzmer et al. | 364/200 |
| 3,553,651 | 1/1971 | Bird et al. | 364/900 |
| 3,686,641 | 8/1972 | Logan et al. | 364/200 |
| 3,818,461 | 6/1974 | Ward et al. | 340/172.5 |

Primary Examiner—Gareth D. Shaw
Assistant Examiner—Thomas M. Heckler
Attorney, Agent, or Firm—Finnegan, Henderson, Farabow & Garrett

[57] ABSTRACT

An information transfer control system for controlling the information transfer between a data processor and an input/output device is disposed between the data processor and the input/output device. The information transfer control system comprises a first-in/first-out stack for temporarily storing transferring information being transferred, an up/down counter with a preset function for selectively designating the address lines desired of the stack through a decoder, and a register for setting up a counting range of the counter. The addressing range data to be counted in the up/down counter is initialized in the up/down counter through a program.

2 Claims, 6 Drawing Figures

INFORMATION TRANSFER CONTROL SYSTEM

BACKGROUND OF THE INVENTION

The present invention relates to an information transfer control system and, more particularly, to a system for controlling the information transfer by using a first-in/first-out stack.

In general, an information processor such as a minicomputer or a microcomputer employs a first-in/first-out stack (hereinafter termed simply FIFO) having a buffering function, as an interface for information transfer.

A conventional information transfer system with the FIFO stack is shown in FIG. 1. In the figure, reference numeral 11 designates a data processor, 12 an input/output (I/O) device, 13 a first FIFO stack providing an information transfer from the processor 11 to the I/O device 12 and 14 a second FIFO stack providing an information transfer from the I/O device 12 to the information processor 11. The information transfer between the processor 11 and the I/O device 12 is generally bidirectional. Nevertheless, the conventional FIFO stack has an ability of only one-way information transfer, and is ineffective in controlling the direction of the information transfer from exterior. It is for this reason that the conventional information transfer control system as shown in FIG. 1 needs a pair of FIFO stacks between the data processor 11 and the input/output device 12. Further, in the conventional one, it is impossible to concurrently transfer the input and output information between the data processor 11 and the input/output devices 12. Therefore, the FIFO stacks 13 and 14 never operate concurrently but alternately operate with a time interval. This means that the use of one of the FIFO stacks is shortened in time, thus resulting in reduction of the use efficiency of the FIFO stack.

SUMMARY OF THE INVENTION

Accordingly, an object of the present invention is to provide an information transfer control system with a single FIFO stack permitting a bidirectional information transfer.

According to the present invention, an information transfer control system for controlling information transfer between the data processor and the input/output device comprises; a first-in/first-out stack disposed between the data processor and the input/output device, temporarily to store the transferring information; an up/down counter with a preset function selectively to designate address lines in said stack; and means for setting up a counting range of the counter. In the setting means, an addressing range defined between the initial address and the final address is set up in accordance with the direction of the information transfer through a program and is stored in a register. The addressing range information (the beginning and end addresses) stored in the register controls the range of the up/down counter. According to the present invention, a bidirection information transfer is carried out by a single FIFO stack so that the operation efficiency of the stack is improved.

Further, since the initial address and the final address are set through a program, a precise information transfer is ensured.

Other objects and features of the present invention will be apparent from the following description in conjunction with the accompanying drawings, in which:

DETAILED DESCRIPTION OF THE PREFERRED EMBODIMENTS

Figure 1:
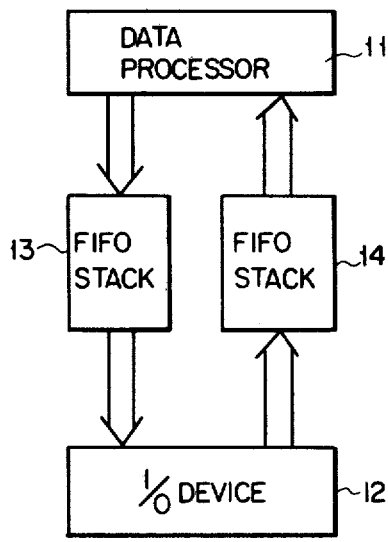
FIG. 1 is a block diagram of a conventional information transfer control system using FIFO stacks.
Figure 2:
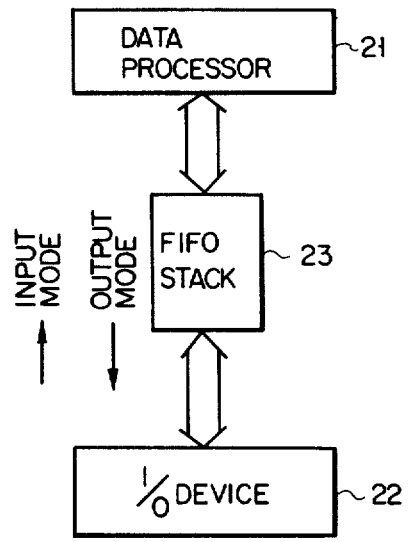
FIG. 2 is a block diagram of an embodiment of an information transfer control system according to the present invention.

Reference is now made to FIG. 2 illustrating an embodiment of an information transfer control system according to the present invention. In this figure, reference numeral 21 designates a data processor comprising an ordinary minicomputer or microcomputer, for example. Reference numeral 22 designates an input/output device such as, for example, readers (PTR), punchers (PTP), magnetic tape apparatuses (MT), magnetic disc apparatuses, typewriters (TYP), and terminal devices for data communication. A FIFO stack designated by reference numeral 23 is essential to the present invention and is capable of a bidirectional data transfer through its switching operation.

In general, the direction of data transfer between the data processor 21 and the input/output device 22 is established in the following manner. First, the transfer direction of information in the data processor 21 is established through a program. Incidentally, the transfer direction of data means an input or output direction in the drawing. Second, the FIFO stack 23 is set in the operating direction. Finally, the input/output device 22 is set in the transfer direction of data. Practically, a relatively large time lag period is needed for setting up the transfer direction of information in the data processor 21 and the input/output device 22. This time lag period is large enough to permit an establishment of the operating direction of the FIFO stack 23.

In the present invention, the operating direction of the FIFO stack is controlled by using such a large time lag period.

Figure 3:
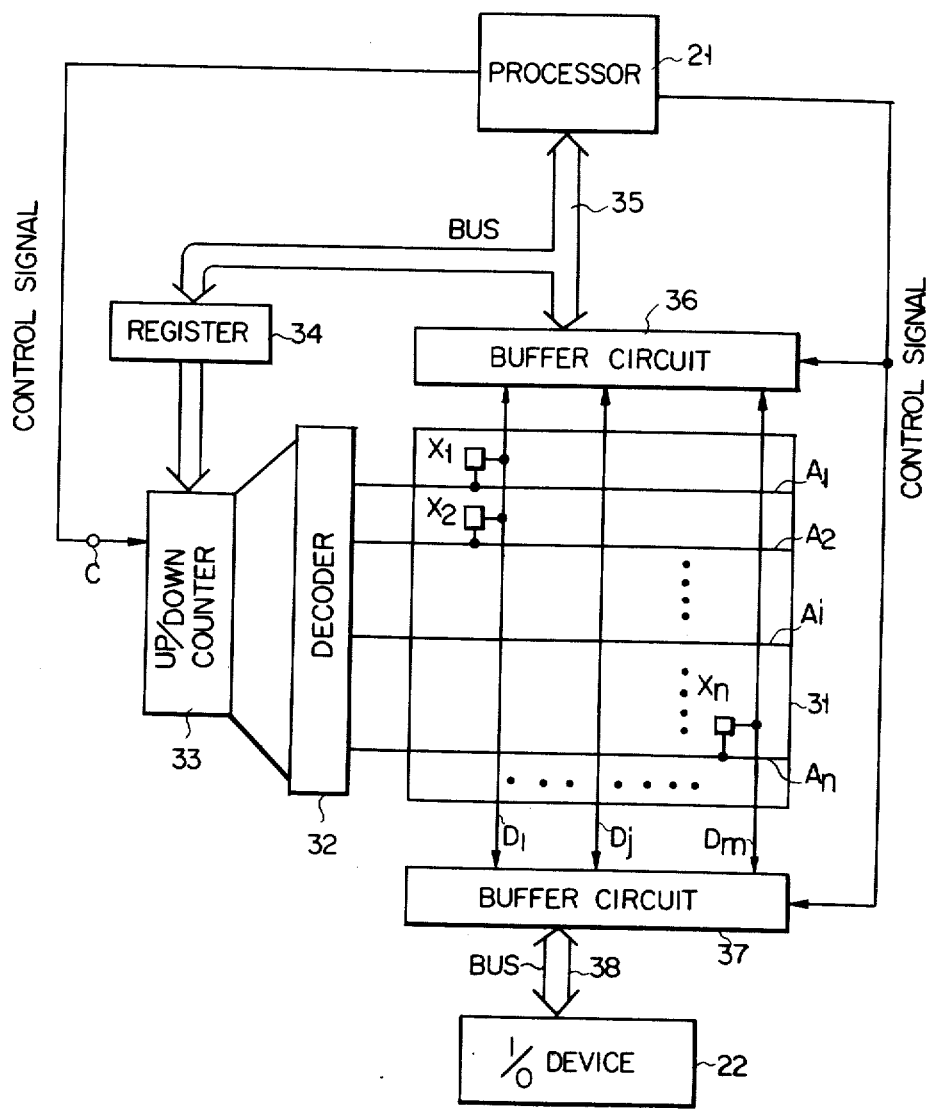
FIG. 3 shows in a block form a detail of the information transfer control system of FIG. 2.

FIG. 3 shows a control circuit for the bidirectional FIFO stack according to the present invention. In the figure, the construction of the FIFO stack is designated by reference numeral 31. As shown in the figure, the FIFO stack consists of $n$ words stacked in parallel each word consisting $m$ bits. More precisely, the FIFO stack 31 comprises a matrix with the row of $m$ memory cells and with the column of $n$ memory cells, with an assumption that each bit of the word corresponds to a memory cell. Those memory cells are here designated by reference characters $X1$ to $Xn$.

Those memory cells are connected by address lines $A1$ to $An$ for addressing a desired word and by digit lines $D1$ to $Dn$ for designating desired digits of the word. In the FIFO stack 31, a desired information is read out of the memory cells addressed by the address information fed through the address lines $A1$ to $An$. The information fed through the digit lines $D1$ to $Dm$ is written into the memory cells designated by the address information fed through the address lines $A1$ to $An$.

Those address lines A$l$ to A$n$ are connected with a decoder 32 of which the input side is connected with an up/down counter 33. The decoder 32 receives an output from the up/down counter 33 and delivers an address signal corresponding to the output of the up/down counter 33 to the address lines A$l$ to A$n$. In this example, the up/down counter is comprised of an ordinary up/down counter with a preset function. A terminal C of the counter 33 receives a control signal delivered from the data processor 21 of FIG. 2. The control signal is classified into two; one to count the counter up, the other to count it down. When the control signal applied to the terminal C is the count-down signal, the address lines A$l$ to A$n$ for addressing successively energized to have a logic level "1" in the order of A$l$ to A$n$. Thus, the addressing operation in the FIFO stack 31 stepwisely progresses. In this case, the FIFO stack 31 operates in an output mode. To the contrary, if the control signal to be applied to the terminal C is the count-up signal, the address lines A$l$ to A$n$ for addressing the memory cells desired in the FIFO stack 31 are successively energized to have a logic level "1" in the order of A$n$ to A$l$. In this manner, the addressing operation in the FIFO stack 31 stepwisely progresses in the direction inverse to the previous case. That is, the FIFO stack 31 operates in an input mode.

As seen from the foregoing description, the operating direction of the FIFO stack 31 may be switched from the up to down direction and vice versa, in accordance with the nature of the control signal applied to the terminal C. Here, the terms "up direction" and "down direction" indicate the directions as shown in the FIG. 2 and are designated by arrows. The "up" direction corresponds to the transfer direction of information in the input mode while the "down" direction to that in the output mode.

The register 34 connected with the up/down counter 33 temporarily stores the data to be stored into the counter 33. The data stored is the one designating the counting range of the up/down counter 33, i.e. includes the count beginning and the count end values. More precisely, the counting range data includes an initial address data and a final address data for reading and writing data from and into the FIFO stack 31. The counting range data is transferred from the data processor 21 to the register 34 through a bus 35, under the control of the program in the data processor 21. This data transfer is performed at a predetermined timing. Buffers 36 and 37 connected with the digit lines D$l$ to D$n$ serve to protect the FIFO stack 31 from being detrimentally affected by the data processor 21 and the input/output device 22. The contents of the memory cells X$l$ to X$n$ are transferred to the input/output device 22 through the buffer 37 and a bus 38.

Figure 4:
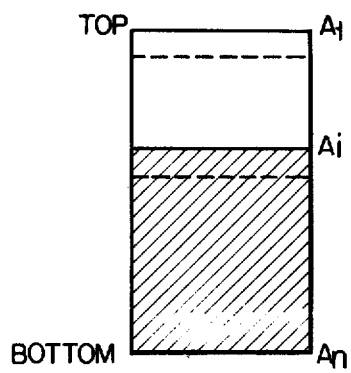
FIGS. 4 and 5 schematically show stack structures for illustrating the operation of the information transfer control system according to the present invention.

The information transfer control system shown in FIG. 3 smoothly operates in case where the information stored in the FIFO stack 31 is successively transferred beginning at the address A$l$ or A$n$. However, in case where the addresses A$l$ to A$n$ in the FIFO stack 31 are full of data, as shown in FIG. 4, after the information is transferred from the processor 21 to the input/output device 22, there is a problem in the transfer of the stored data (the shaded portion in FIG. 4) to the data processor 21, even if the information flow in the FIFO stack 31 is changed to the up direction (input mode) in response to the control signal from the processor 21, and the buffer 37 is switched to buffer 36. The reason for this is that when the information transfer direction in the FIFO stack 31 is switched, the data first appearing in the buffer 36 is the data stored in the memory cells on the A$l$ address (TOP) of the stack 31, i.e. dummy data, and not the data stored in the memory cells arranged on the address A$i$. In order to avoid the problem of dummy data, in the present invention, the initial address A$i$ is loaded into the register 34 from the processor 21 through the bus 35, under the control of the program, and the contents A$i$ stored in the register 34 is preset in the up/down counter 33 at a predetermined timing as the information transfer direction is switched. In other words, since the up/down counter 33 is set A$i$ of the contents of the register 34 as the data flow of the stack 31 is changed in the direction, the address in the FIFO stack 31 to be designated is not the address A$l$ but the address A$i$. Thus, the data stored in the memory locations is successively transferred to the data processor 21 through the buffer 36 and the bus 35, while that data transfer begins at the address A$i$.

Figure 5:
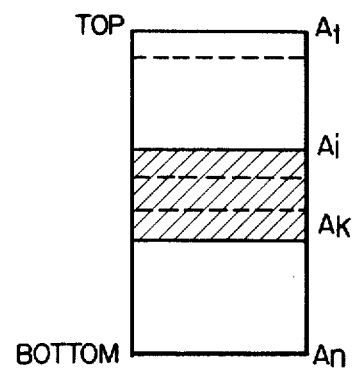

There is another case of data storage of the FIFO stack 31 in which data is stored in the memory locations ranging from the address A$i$ to A$k$ in the midway of the FIFO stack 31, as shown in FIG. 5. In such a case, the present invention also enables the count beginning and the count end values to be set up in the counter 33. In other words, the present invention may designate the address ranging from the initial address to the final address of the FIFO stack 31.

In this case, when the information flow in the FIFO stack 31 is set in the up direction (input mode shown in FIG. 2), the program causes the initial address information A$i$ and the final address information A$k$ from the data processor 21 to be loaded into the register 33 through the bus 35. Then, the data processor 21 applies to the terminal C the control signal for counting up the counter 33 while at the same time another control signal to the buffer 36 for enabling the buffer 36. At this time, the initial value A$i$ stored in the register 34 is preset in the counter 33. Upon receipt of the control signal, the counter 33 starts to count up from the initial value A$i$ preset in the counter. With the counting-up operation of the counter 33, the decoder 32 successively selects the address lines A$i$ to A$k$. Then, the data stored in the memory cell X$i$ in the FIFO stack 31 selected by the address lines A$i$ to A$k$, is read out to the buffer 36 via the digit line D$i$, for example. It is noted here that whether the data stored in the memory cells from the addresses A$i$ to A$k$ are destroyed or not may be desirably determined by the program. The counter 33 counts up to the final address A$k$ to stop its counting operation.

In case where the stored data shown in FIG. 5 is desired to be transferred in the down direction (output mode shown in FIG. 2), the initial value and the end value of the counting range are set inversely. More precisely, the A$k$ is used as the initial address, the A$i$ as the final address and the counting range data for addressing is set in the register 34 and the counter 33 through the program, as previously stated. Additionally, processor 31 applies to the terminal C the control signal for counting down the counter 33. At the same time, it provides to the buffer 37 the control signal for switching the buffer. In this manner, the desired data stored in the FIFO stack 31 through the program is precisely transferred to the I/O device through the buffer 37 and the bus 38.

Figure 6:
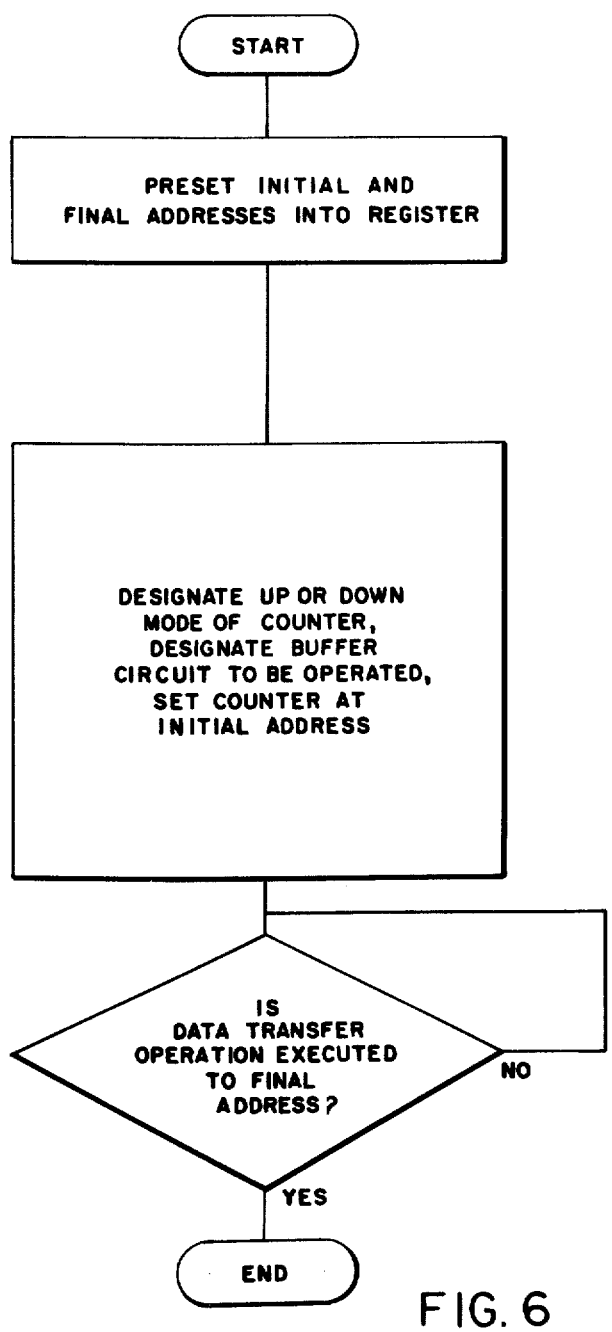
FIG. 6 is a flow chart showing operation of an information transfer control system in accordance with the teachings of the present invention.

Referring to the flow chart illustrated in FIG. 6, the above description of the teachings of the present invention may be summarized as follows. An information control system has been disclosed for controlling the transfer of information in one direction in response to a first control signal and in the other direction in response to a second control signal between a data processor and an input/output device. As illustrated herein, the system begins operation by the presetting of an initial address and a final address into register 34 as illustrated in the flow diagram of FIG. 6. Up/down counter 33 is set at an initial count representing the initial address preset into register 34. This step is also illustrated in FIG. 6.

Next, terminal C of counter 33 receives a control signal from the data processor 21 of FIG. 2 which control signal either indicates to counter 33 to count up or to count down while at the same time another control signal is sent to buffer circuits 36 and 37 for enabling either buffer circuit 36 or buffer circuit 37 depending upon the direction of desired information transfer. At this time, the initial address stored in register 34 operates to preset counter 33 at a value designating this initial address. The three steps of designating up or down mode of counter 33, designating which of buffer circuits 36 or 37 is to be operated, and setting counter 33 to a value indicative of the initial address stored in register 34 are shown in the chart of FIG. 6.

Thereafter, counter 33 starts to count in the designated direction from the initial value established by the initial address preset into register 34 until counter 33 reaches a value representative of the final address stored in register 34. This operation is further illustrated in the flow chart of FIG. 6. Upon reaching a count representative of the final address containing information to be transferred, the operation of the system is completed.

What we claim is:

1. An information transfer control system for controlling the transfer of information in one direction or the other between a data processor and an input/output device; the data processor producing a count-up control signal and a count-down control signal depending upon the direction of desired information transfer and the data processor further producing a switching control signal designating that information is desired to be transferred, said control system comprising:

a first-in/first-out stack disposed between the data processor and the input/output device for transferring information supplied from the data processor to the input/output device and for transferring information supplied from the input/output device to the data processor and for temporarily storing said information in the stack;

an up/down counter with a preset function which executes its counting-up or counting-down operation in response to a count-up or count-down control signal applied from the data processor and in response to its counting operations delivers an output signal for designating addresses of the stack;

an address decoder connected to the counter to decode the output signal of the counter so as to designate a unique address at said stack for each individual output signal of said counter;

register means for storing an initial address and final address located anywhere within said stack from the data processor to initially set said output signal of said counter at a value designating said initial address and to prevent said counter from counting from said initially set value beyond a value of said output signal designating said final address; and buffer circuit means for coupling the data processor and the stack and for coupling the stack and the input/output device in response to the direction of desired information transfer between the processor and the stack and between the stack and the input/output device upon receipt of a switching control signal applied from the processor.

2. An information transfer control system for controlling the transfer of information in one direction in response to a first control signal or the other direction in response to a second control signal between a data processor and an input/output device comprising:

a first-in first-out stack having a plurality of memory cells identified by unique sequential addresses for temporarily storing information supplied from the data processor to be transferred to the input/output device and for temporarily storing information supplied from the input/output device to be transferred to the data processor;

means for selectively registering an initial one of said addresses of said stack located anywhere within said stack which initial address identifies the storage location in the stack of the beginning of the information to be transferred and for selectively registering a range of said addresses of said stack containing the information to be transferred;

counter means for sequentially addressing memory cells in said stack from said initial address of said stack in a first direction over said range of addresses upon receipt of the first control signal and for addressing memory cells in said stack from said initial address in a second direction opposite said first direction over said range of addresses upon receipt of the second control signal; and buffer circuit means provided between the data processor and the stack and between the stack and the input/output device for coupling said memory cells addressed by said counter means to said processor upon data being transferred in either direction between said processor and said stack and for coupling said memory cells addressed by said counter means to said input/output device upon data being transferred in either direction between said input/output device and said stack.

* * * * *